United States Patent
Ha

(10) Patent No.: US 11,386,005 B2
(45) Date of Patent: Jul. 12, 2022

(54) MEMORY SYSTEM, MEMORY CONTROLLER, AND METHOD OF OPERATING MEMORY SYSTEM FOR CACHING JOURNAL INFORMATION FOR ZONE IN THE JOURNAL CACHE

(71) Applicant: SK hynix Inc., Icheon-si (KR)

(72) Inventor: Chan Ho Ha, Icheon-si (KR)

(73) Assignee: SK HYNIX INC., Icheon-Si (KR)

( * ) Notice: Subject to any disclaimer, the term of this patent is extended or adjusted under 35 U.S.C. 154(b) by 0 days.

(21) Appl. No.: 17/156,308

(22) Filed: Jan. 22, 2021

(65) Prior Publication Data

US 2022/0004496 A1   Jan. 6, 2022

(30) Foreign Application Priority Data

Jul. 6, 2020 (KR) .................. 10-2020-0082517

(51) Int. Cl.
*G06F 12/0804* (2016.01)
*G06F 12/1009* (2016.01)

(52) U.S. Cl.
CPC ...... *G06F 12/0804* (2013.01); *G06F 12/1009* (2013.01); *G06F 2212/1044* (2013.01); *G06F 2212/657* (2013.01)

(58) Field of Classification Search
CPC ............ G06F 12/0804; G06F 12/1009; G06F 2212/1044; G06F 2212/657
See application file for complete search history.

(56) References Cited

U.S. PATENT DOCUMENTS

| | | | | |
|---|---|---|---|---|
| 10,990,526 B1* | 4/2021 | Lam | ............... | G06F 12/0246 |
| 2010/0049921 A1* | 2/2010 | Aronovich | ............ | G06F 16/172 711/130 |
| 2011/0231596 A1* | 9/2011 | Goss | ............... | G06F 12/0246 711/103 |
| 2019/0146911 A1* | 5/2019 | Ha | ............... | G06F 11/1068 711/103 |
| 2019/0361611 A1* | 11/2019 | Hosogi | ............ | G06F 3/0631 |
| 2021/0397562 A1* | 12/2021 | Bhardwaj | ......... | G06F 12/0253 |

FOREIGN PATENT DOCUMENTS

| KR | 10-2012-0133033 A | 12/2012 |
|---|---|---|
| KR | 10-2016-0002109 A | 1/2016 |

* cited by examiner

*Primary Examiner* — Sean D Rossiter
(74) *Attorney, Agent, or Firm* — Perkins Coie LLP

(57) ABSTRACT

Disclosed are a memory system, a memory controller, and a method of operating a memory system. The memory system may control the memory device to store data into zones of memory blocks in the memory device by assigning each data to be written with an address subsequent to a most recently written address in a zone, store journal information including mapping information between a logical address and a physical address for one of the one or more zones in a journal cache, search for journal information corresponding to a target zone targeted to write data when mapping information for the target zone among the one or more zones is updated, and replace the journal information corresponding to the target zone with journal information including the updated mapping information.

15 Claims, 15 Drawing Sheets

$A <= B <= C$

MEMORY SYSTEM, MEMORY CONTROLLER, AND METHOD OF OPERATING MEMORY SYSTEM FOR CACHING JOURNAL INFORMATION FOR ZONE IN THE JOURNAL CACHE

CROSS REFERENCE TO RELATED APPLICATION

This patent document claims the priority and benefits of Korean patent application number 10-2020-0082517 filed on Jul. 6, 2020, which is incorporated herein by reference in its entirety.

TECHNICAL FIELD

Embodiments of the disclosed technology relate to a memory system, a memory controller, and a method of operating a memory system.

BACKGROUND

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute the command or control read/write/erase operations on the memory devices in the memory system. The memory controller may be used to execute firmware operations for performing a logical operation for controlling such operations.

A memory system stores information associated with a change in mapping information between a logical address received from a host and an actual physical address of a memory device the logical address is mapped to. Such information can be generated during a process of reading, writing, or eliminating data, through journal information to protect such mapping information in a case of a sudden power off (SPO) of the memory system. When the amount of stored journal information increases and reaches a predetermined threshold level, the memory system may write the stored journal information in the memory device to reflect the change in the mapping information in the memory device, and a write operation requested by the host is suspended while the journal information is written to the memory device. Accordingly, frequent write operations of the journal information on the memory device may result in a decrease in the system performance.

SUMMARY

The technology disclosed in this patent document can be implemented in various embodiments of the disclosed technology to provide a memory system, a memory controller, and a method of operating a memory system capable of reducing the frequency of writing journal information in the memory device.

Further, embodiments of the disclosed technology may provide a memory system, a memory controller, and a method of operating a memory system capable of improving the performance of a write operation requested by a host.

In an aspect of the disclosed technology, a memory system is disclosed. The memory system includes a memory device including memory cells for storing data and operable to perform an operation on one or more memory cells. The operation includes a read operation for reading data stored in one or more memory cells, a program operation for writing new data into one or more memory cells, or an erase operation for deleting stored data in one or more memory cells and a memory controller in communication with the memory device and configured to control the memory device to perform an operation.

The memory controller may control the memory device to store data into zones of memory blocks in the memory device by assigning each data to be written with an address subsequent to a most recently written address in a zone, wherein the zones of memory blocks are split from a namespace in the memory device.

The memory controller may store, in a journal cache, journal information including mapping information between a logical address and a physical address for one of the one or more zones.

The memory controller may search, in the journal cache, for journal information corresponding to a target zone targeted to write data, when mapping information for the target zone among the one or more zones is updated.

The memory controller may replace the journal information corresponding to the target zone with journal information including the updated mapping information.

The journal information corresponding to the target zone may include a write pointer indicating an address for writing data in the target zone.

The memory controller may update the write pointer in a sequence in which a value of the write pointer increases.

When searching for the journal information corresponding to the target zone in the journal cache, the memory controller may search for one or more pieces of journal information cached in the journal cache in an inverse chronological order of data storage events.

When a number of pieces of information to be additionally stored in the journal cache are smaller than or equal to a first threshold, the memory controller may evict all pieces of journal information cached in the journal cache from the journal cache.

The memory controller may migrate all pieces of journal information evicted from the journal cache to a journal buffer, and write all pieces of journal information stored in the journal buffer in the memory device when a number of pieces of journal information to be additionally stored in the journal buffer, is smaller than or equal to a second threshold.

A size of the journal cache may be proportional to a maximum value of a number of open zones available for writing data among the one or more zones.

In another aspect of the disclosed technology, a memory controller is disclosed. The memory controller includes a memory interface in communication with a memory device and a processor in communication with the memory device through the memory interface.

The processor may control the memory device to store data into zones of memory blocks in the memory device by assigning each data to be written with an address subsequent to a most recently written address in a zone, wherein the zones of memory blocks are split from a namespace in the memory device.

The processor may store, in a journal cache, journal information including mapping information between a logical address and a physical address for one of the one or more zones.

When mapping information for the target zone among the one or more zones is updated, the processor may search, in the journal cache, for journal information corresponding to a target zone targeted to write data.

The processor may replace the journal information corresponding to the target zone with journal information including the updated mapping information.

The journal information corresponding to the target zone may include a write pointer indicating an address for writing data in the target zone.

The processor may update the write pointer in a sequence in which a value of the write pointer increases.

When searching the journal information corresponding to the target zone, the processor may search for one or more pieces of journal information cached in the journal cache in an inverse chronological order.

When a number of pieces of journal information, which can be additionally stored in the journal cache, is smaller than or equal to a first threshold, the processor may evict all pieces of journal information cached in the journal cache from the journal cache.

The processor may migrate all pieces of journal information evicted from the journal cache to a journal buffer, and when a number of pieces of journal information to be additionally stored in the journal buffer is smaller than or equal to a second threshold, write all pieces of journal information stored in the journal buffer in the memory device.

A size of the journal cache may be proportional to a maximum value of a number of open zones available for writing data among the one or more zones.

In another aspect of the disclosed technology, a method of operating a memory system including a memory device is disclosed.

The method may include controlling the memory device to store data into zones of memory blocks in the memory device by assigning each data to be written with an address subsequent to a most recently written address in a zone, wherein the zones of memory blocks are split from a namespace in the memory device.

The method may include storing, in a journal cache, journal information including mapping information between a logical address and a physical address for one of the one or more zones.

The method may include searching, in the journal cache, for journal information corresponding to a target zone targeted to write data when mapping information for the target zone among the one or more zones is updated. The searching for the journal information corresponding to the target zone may include searching for one or more pieces of journal information cached in the journal cache in an inverse chronological order of data storage events.

The method may include replacing the journal information corresponding to the target zone with journal information including the updated mapping information.

The journal information corresponding to the target zone may include a write pointer indicating an address for writing data in the target zone. The write pointer may be updated in a direction in which a value of the write pointer increases.

The method may further include, when a number of pieces of information to be additionally stored in the journal cache, is smaller than or equal to a first threshold, evicting all pieces of journal information cached in the journal cache from the journal cache.

The method may further include migrating all pieces of journal information evicted from the journal cache to a journal buffer and, when a number of pieces of journal information to be additionally stored in the journal buffer is smaller than or equal to a second threshold, writing all pieces of journal information stored in the journal buffer in the memory device.

A size of the journal cache may be proportional to a maximum value of a number of open zones available for writing data among the one or more zones.

In another aspect of the disclosed technology, a memory system is disclosed. The memory system may include a memory device and a memory controller configured to control the memory device.

The memory controller may split a namespace (NS) included in the memory device into one or more zones in which data can be sequentially written.

The memory controller may cache journal information including mapping information between a logical address and a physical address for one of the one or more zones in a journal cache.

The memory controller may search for journal information corresponding to a target zone in the journal cache when mapping information for the target zone among the one or more zones is updated.

The memory controller may replace the journal information corresponding to the target zone with journal information including the updated mapping information.

When data is written in the target zone, the journal information corresponding to the target zone may include a write pointer indicating an address of the written data.

The memory controller may update the write pointer in a direction in which a value of the write pointer increases.

When searching for the journal information corresponding to the target zone in the journal cache, the memory controller may search for one or more pieces of journal information cached in the journal cache in an inverse chronological order.

When a number of pieces of information, which can be additionally stored in the journal cache, is smaller than or equal to a first threshold, the memory controller may evict all pieces of journal information cached in the journal cache from the journal cache.

The memory controller may migrate all pieces of journal information evicted from the journal cache to a journal buffer, and write all pieces of journal information stored in the journal buffer in the memory device when a number of pieces of journal information, which can be additionally stored in the journal buffer, is smaller than or equal to a second threshold.

A size of the journal cache may be proportional to a maximum value of a number of open zones in which writing is possible among the one or more zones.

In another aspect of the disclosed technology, a memory controller is disclosed. The memory controller may include a memory interface configured to communicate with a memory device and a processor configured to communicate with the memory device through the memory interface and execute firmware.

The processor may split a namespace included in the memory device into one or more zones in which data can be sequentially written.

The processor may cache journal information including mapping information between a logical address and a physical address for one of the one or more zones in a journal cache.

When mapping information for the target zone among the one or more zones is updated, the processor may search for journal information corresponding to a target zone in the journal cache.

The processor may replace the journal information corresponding to the target zone with journal information including the updated mapping information.

When data is written in the target zone, the journal information corresponding to the target zone may include a write pointer indicating an address of the written data.

The processor may update the write pointer in a direction in which a value of the write pointer increases.

When searching the journal information corresponding to the target zone, the processor may search for one or more pieces of journal information cached in the journal cache in an inverse chronological order.

When a number of pieces of journal information, which can be additionally stored in the journal cache, is smaller than or equal to a first threshold, the processor may evict all pieces of journal information cached in the journal cache from the journal cache.

The processor may migrate all pieces of journal information evicted from the journal cache to a journal buffer, and when a number of pieces of journal information, which can be additionally stored in the journal buffer, is smaller than or equal to a second threshold, write all pieces of journal information stored in the journal buffer in the memory device.

A size of the journal cache may be proportional to a maximum value of a number of open zones in which writing is possible among the one or more zones.

In another aspect of the disclosed technology, a method of operating a memory system including a memory device is disclosed.

The method may include splitting a namespace (NS) included in the memory device into one or more zones in which data can be sequentially written.

The method may include caching journal information including mapping information between a logical address and a physical address for one of the one or more zones in a journal cache.

The method may include searching for journal information corresponding to a target zone in the journal cache when mapping information for the target zone among the one or more zones is updated. The searching for the journal information corresponding to the target zone may include searching for one or more pieces of journal information cached in the journal cache in an inverse chronological order.

The method may include replacing the journal information corresponding to the target zone with journal information including the updated mapping information.

When data is written in the target zone, the journal information corresponding to the target zone may include a write pointer indicating an address of the written data. The write pointer may be updated in a direction in which a value of the write pointer increases.

The method may further include, when a number of pieces of information, which can be additionally stored in the journal cache, is smaller than or equal to a first threshold, evicting all pieces of journal information cached in the journal cache from the journal cache.

The method may further include migrating all pieces of journal information evicted from the journal cache to a journal buffer and, when a number of pieces of journal information, which can be additionally stored in the journal buffer, is smaller than or equal to a second threshold, writing all pieces of journal information stored in the journal buffer in the memory device.

A size of the journal cache may be proportional to a maximum value of a number of open zones in which writing is possible among the one or more zones.

Based on embodiments of the disclosed technology, it is possible to reduce the frequency of writing journal information in the memory device.

Further, based on embodiments of the disclosed technology, it is possible to improve the performance of the write operation requested by the host.

DETAILED DESCRIPTION OF THE EXEMPLARY EMBODIMENTS

Hereinafter, embodiments of the disclosed technology will be described in detail with reference to the accompanying drawings.

Figure 1:
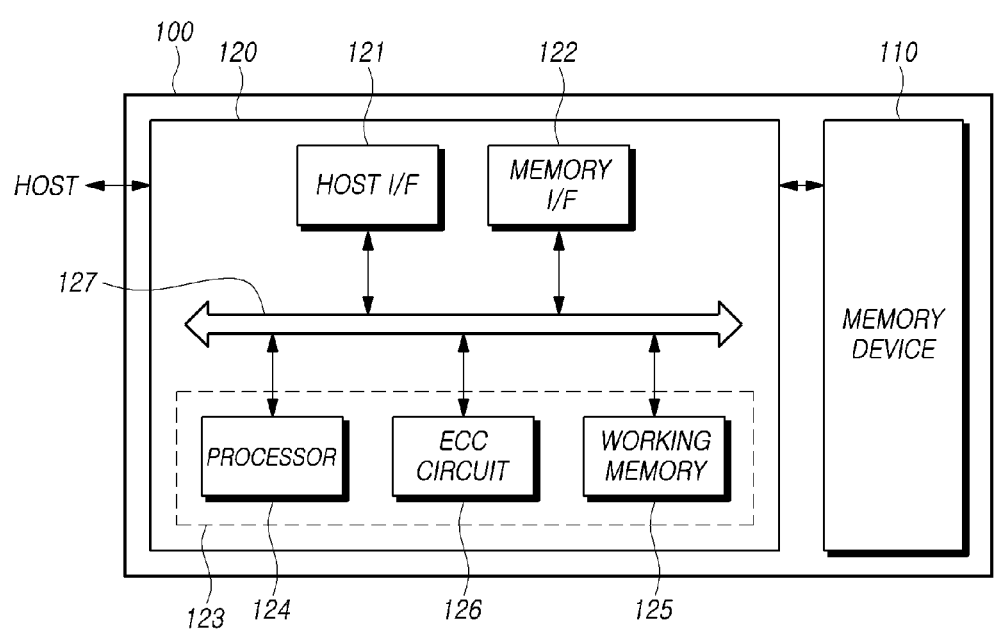
FIG. 1 is a schematic diagram illustrating a configuration of a memory system based on an embodiment of the disclosed technology.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In this patent document, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
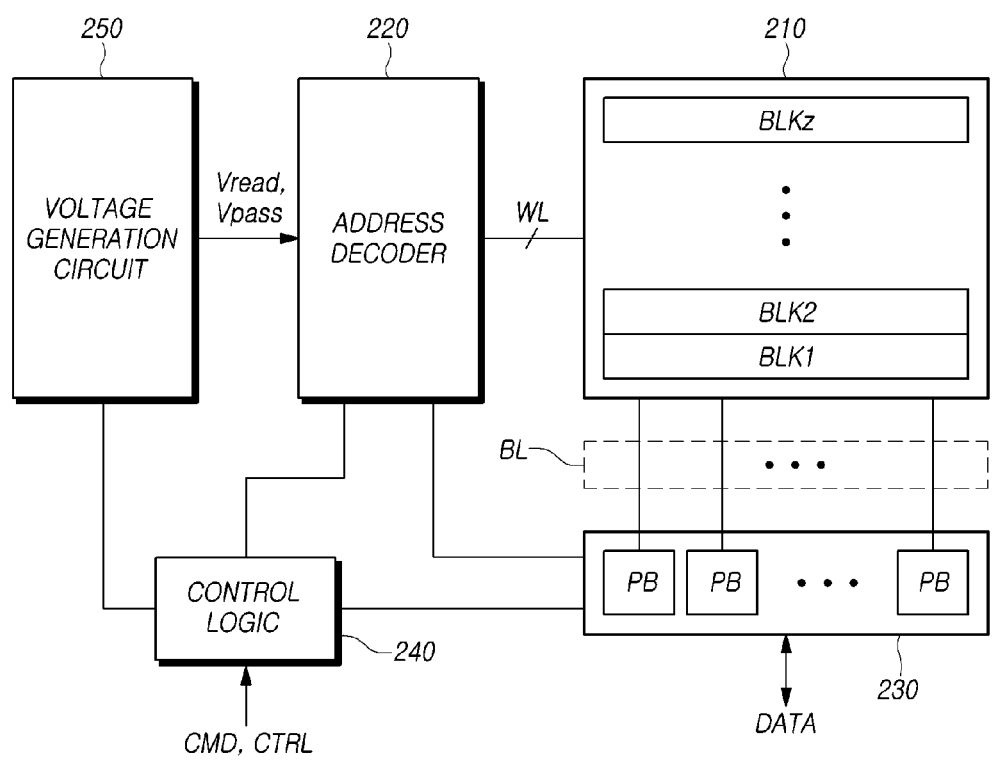
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC)

configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
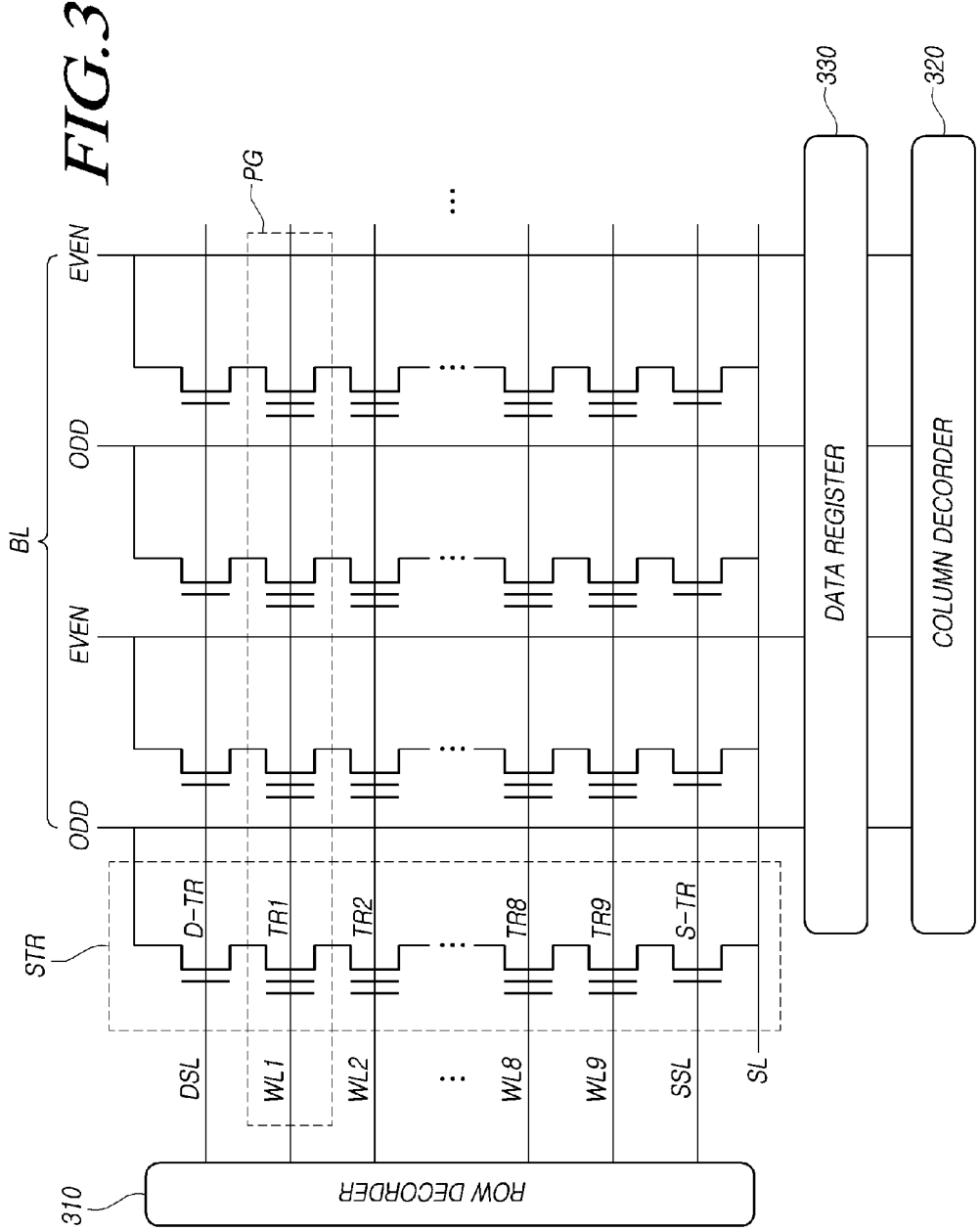
FIG. 3 is a diagram illustrating a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line and even-numbered bit line are coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
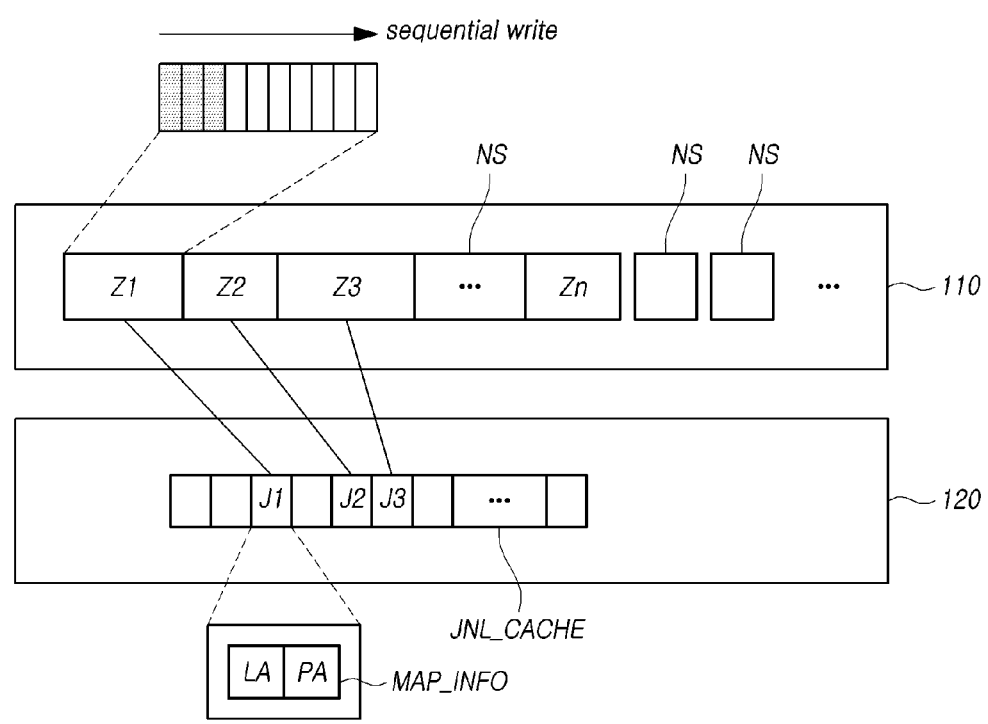
FIG. 4 is a diagram schematically illustrating a memory system based on some embodiments of the disclosed technology.

FIG. 4 is a diagram schematically illustrating the memory system 100 based on some embodiments of the disclosed technology.

Referring to FIG. 4, the memory controller 120 of the memory system 100 may split a namespace (NS) included in the memory device 110 into one or more zones.

The namespace (NS) refers to each logical space when a data storage space including memory blocks of the memory device 110 is split into a plurality of logical memory spaces such as logical blocks. The memory device 110 may include one or more namespaces, and each namespace may support various sizes and protection types.

A host can configure the size or the protection type of each namespace. The host may recognize respective namespaces as different logical areas (or partitions). The host may instruct the memory system 100 to separately format different namespaces.

In FIG. 4, the memory controller 120 may split the namespace (NS) into n zones Z1, Z2, Z3, . . . Zn (n is a natural number). Each zone may include one or more of memory blocks included in the memory device 110.

When data is written in each zone, the memory controller 120 may control the memory device 110 to sequentially write the data. That is, the data may be written in an address subsequent to the most recently written address in the zone. For example, when a starting address of the zone is 0, an ending address is 200, and the most recent data is written in an address 100, the next data is written in an address 101 and is not written in another address.

The memory controller 120 may, in a journal cache (JNL_CACHE), cache journal information including mapping information (MAP_INFO) of one of the n zones. The mapping information (MAP_INFO) is used to map a logical address of the host to a physical address (PA) of the zone. For example, the mapping information (MAP_INFO) may include a mapping table to indicate which of the physical addresses each logical address is mapped to.

Referring to FIG. 4, the memory controller 120 may cache, in the journal cache (JNL_CACHE), journal information 1 (J1) that includes mapping information (MAP_INFO) of the first zone (Z1). The memory controller 120 may cache, in the journal cache (JNL_CACHE), second journal information (J2) that includes mapping information (MAP_INFO) of the second zone (Z2). The memory controller 120 may cache, in the journal cache (JNL_CACHE), third journal information (J3) that includes mapping information (MAP_INFO) of the third zone (Z3).

On the other hand, when there is no change in mapping information of one zone or when all changes are written in the memory device 110, the memory controller 120 may not cache journal information of the corresponding zone in the journal cache (JNL_CACHE). For example, when there is no change in mapping information (MAP_INFO) of the $n^{th}$ zone (Zn), the memory controller 120 may not cache journal information of the $n^{th}$ zone (Zn) in the journal cache (JNL_CACHE).

In some implementations, the journal cache (JNL_CACHE) may be located in the working memory 125 included in the memory controller 120 or a separate volatile memory included in the memory controller 120. For example, the journal cache (JNL_CACHE) may be located in an SRAM of the working memory 125 or a separate DTCM.

Figure 5:
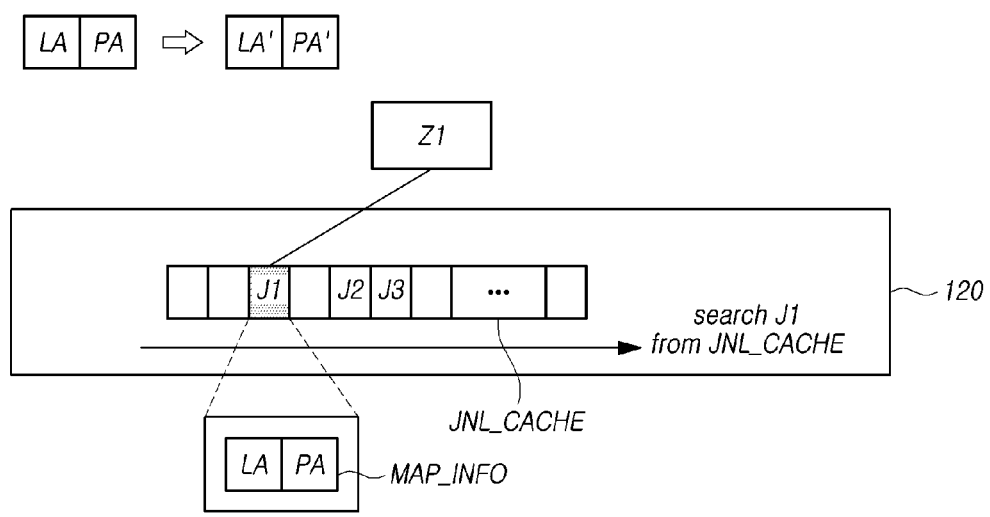
FIG. 5 is a diagram illustrating an operation in which a memory system searches for journal information in a journal cache based on some embodiments of the disclosed technology.

FIG. 5 is a diagram illustrating an operation in which the memory system 100 searches for journal information in the journal cache (JNL_CACHE) based on some embodiments of the disclosed technology.

Referring to FIG. 5, when mapping information (MAP_INFO) of one target zone among the n zones is updated, the memory controller 120 of the memory system 100 may search for journal information corresponding to the target zone in the journal cache (JNL_CACHE) before caching the journal information in which the updated mapping information (MAP_INFO) is reflected. Here, the term "target zone" can indicate a zone that is targeted to be used to perform certain operations (e.g., a zone that is targeted to update mapping information, a zone that is targeted to be searched, a zone that is targeted to perform memory operations thereon)

In the example given below, let's assume that the target zone is a first zone (Z1) of the n zones.

In FIG. 5, it is assumed that, when data is written in the first zone (Z1), mapping information (MAP_INFO) is updated to indicate that a logical address (LA') is mapped to a physical address (PA') for the most recently written data. In this case, the memory controller 120 may store, in the journal information, mapping information indicating that the logical address (LA') is mapped to the physical address (PA').

In FIG. 5, the memory controller 120 may search for journal information 1 (J1) that is journal information corresponding to the first zone (Z1) in the journal cache (JNL_CACHE). The memory controller 120 may search for journal information corresponding to the first zone (Z1) in the journal cache (JNL_CACHE) as will be discussed below.

For example, the memory controller 120 may search for journal information corresponding to the first zone (Z1) sequentially from a starting address or an ending address of the journal cache (JNL_CACHE). In another example, the memory controller 120 may search for journal information corresponding to the first zone (Z1) on the basis of a time at which the journal information is cached in the journal cache (JNL_CACHE).

Figure 6:
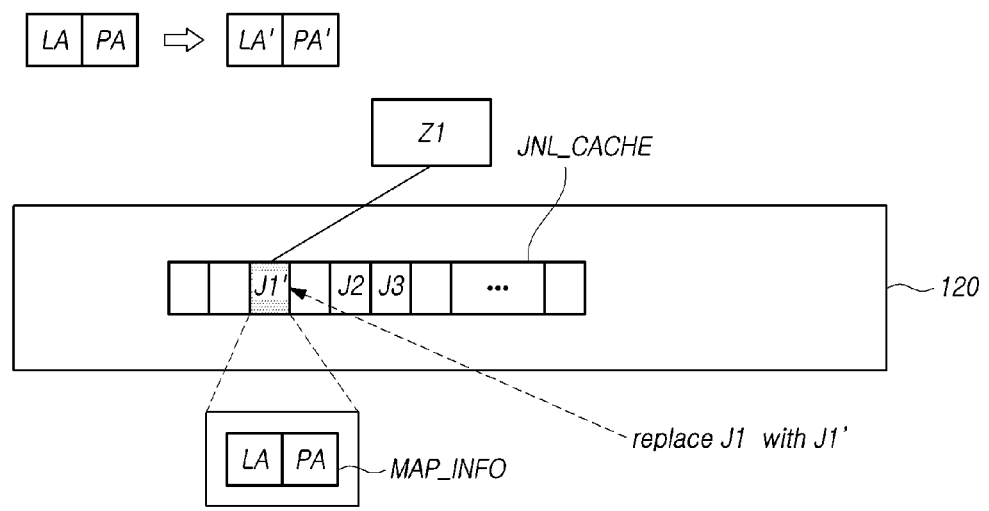
FIG. 6 is a diagram illustrating an operation in which a memory system replaces existing journal information with new journal information in a journal cache based on some embodiments of the disclosed technology.

FIG. 6 is a diagram illustrating an operation in which the memory system 100 replaces the existing journal information with new journal information in the journal cache (JNL_CACHE) based on some embodiments of the disclosed technology.

Referring to FIG. 6, the memory controller 120 may replace the journal information 1 (J1) found in the above searching operation, with journal information 1' (J1') when the searching operating in the journal cache (JNL_CACHE) for journal information 1 (J1), which is the journal information corresponding to the first zone (Z1), is successful. Mapping information (MAP_INFO) included in journal information 1' (J1') may indicate that the logical address (LA') is mapped to the physical address (PA') described with reference to FIG. 5.

When the memory controller 120 changes the journal information corresponding to the first zone (Z1) from journal information 1 (J1) to journal information 1' (J1'), there is no change in the number of pieces of journal information cached in the journal cache (JNL_CACHE). Accordingly, since the number of pieces of journal information cached in the journal cache (JNL_CACHE) does not rapidly increase even in the situation where the mapping information (MAP_INFO) is repeatedly updated, the frequency that the journal information cached in the journal cache (JNL_CACHE) is written in the memory device 110 decreases. Accordingly, since the frequency that a request for writing the data received from the host is blocked decreases due to the operation of writing the journal information in the memory device 110, the memory system 100 may improve the performance of the writing operation requested by the host.

On the other hand, when the search in the journal cache (JNL_CACHE) for journal information 1 (J1), which is the journal information corresponding to the first zone (Z1), fails, the memory controller 120 may add new journal information corresponding to the first zone (Z1) in the journal cache (JNL_CACHE). In this case, the number of pieces of journal information cached in the journal cache (JNL_CACHE) increases by 1, but there is no change in the number of pieces of journal information cached in the journal cache (JNL_CACHE) when the mapping information corresponding to the first zone (Z1) is continuously updated thereafter. Accordingly, the number of pieces of journal information cached in the journal cache (JNL_CACHE) does not rapidly increase.

Figure 7:
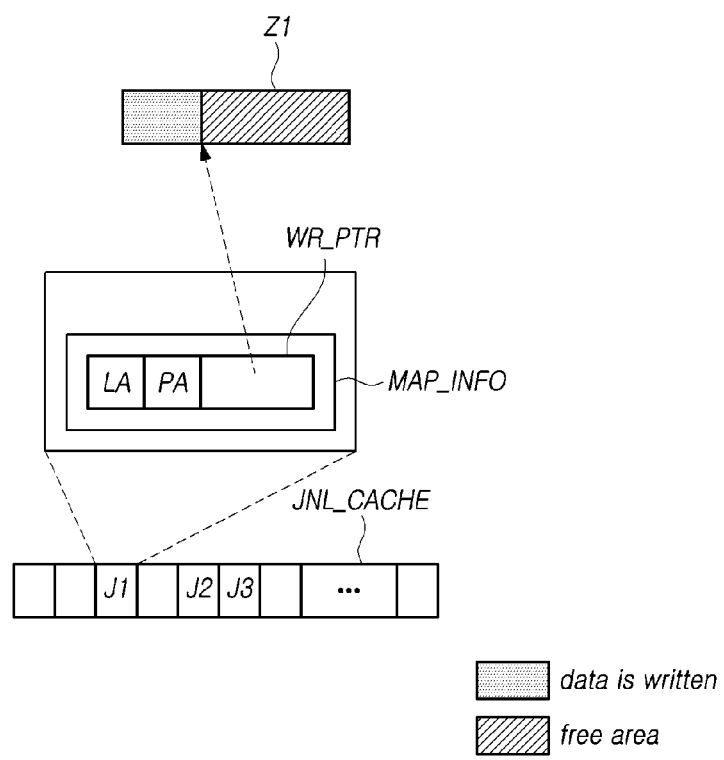
FIG. 7 is a diagram illustrating an example of journal information based on some embodiments of the disclosed technology.

FIG. 7 is a diagram illustrating an example of journal information based on embodiments of the disclosed technology.

Referring to FIG. 7, when the target zone is the first zone (Z1) and data is written in the first zone (Z1), journal information 1 (J1), which is the journal information corresponding to the first zone (Z1) may include a write pointer (WR_PTR) indicating an address of the data written in the first zone (Z1).

As described with reference to FIG. 4, when data is written in the first zone (Z1), the data may be sequentially written. Accordingly, the write pointer (WR_PTR) included in journal information 1 (31) may indicate one address. In addition, the write point (WR_PTR) may be included in mapping information (MAP_INFO) as illustrated in FIG. 7.

The write pointer (WR_PTR) may indicate an address between the start address and the end address of the first zone (Z1). An area from the starting address of the first zone (Z1) to the address indicated by the write pointer (WR_PTR) is an area in which data has been already written sequentially, and new data cannot be written therein. On the other hand, an area from the address indicated by the write pointer (WR_PTR) to the ending address of the first zone (Z1) is a free area with no data written, and thus new data may be written therein.

Figure 8:
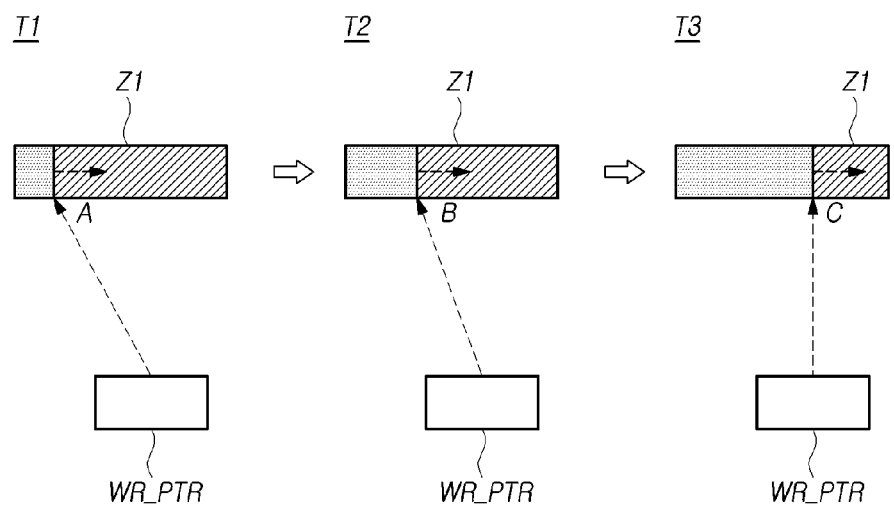
FIG. 8 is a diagram illustrating an operation in which a memory system updates a write pointer based on embodiments of the disclosed technology.

FIG. 8 is a diagram illustrating an operation in which the memory system 100 updates the write pointer (WR_PTR) based on some embodiments of the disclosed technology.

Referring to FIG. 8, the memory controller 120 of the memory system 100 may update the write pointer (WR_PTR) in a sequence in which a value of the write pointer (WR_PTR) increases. That is, the memory controller 120 may update the value of the write pointer (WR_PTR) only in a certain sequence when data is written. As described with reference to FIG. 7, this is because the value of the write pointer (WR_PTR) continuously increases as the data is continuously written in the first zone (Z1) since the data already written in the first zone (Z1) is not overwritten.

In FIG. 8, it is assumed that an address value indicated by the write pointer (WR_PTR) is A at time T1, the address value indicated by the write pointer (WR_PTR) is B at time T2 (T2 is after T1), and the address value indicated by the write point (WR_PTR) is C at time T3 (T3 is after T2).

Since the memory controller 120 can update the write pointer (WR_PTR) in a sequence in which the value of the write pointer (WR_PTR) increases, B is larger than or equal to A and C is larger than or equal to B.

Figure 9:
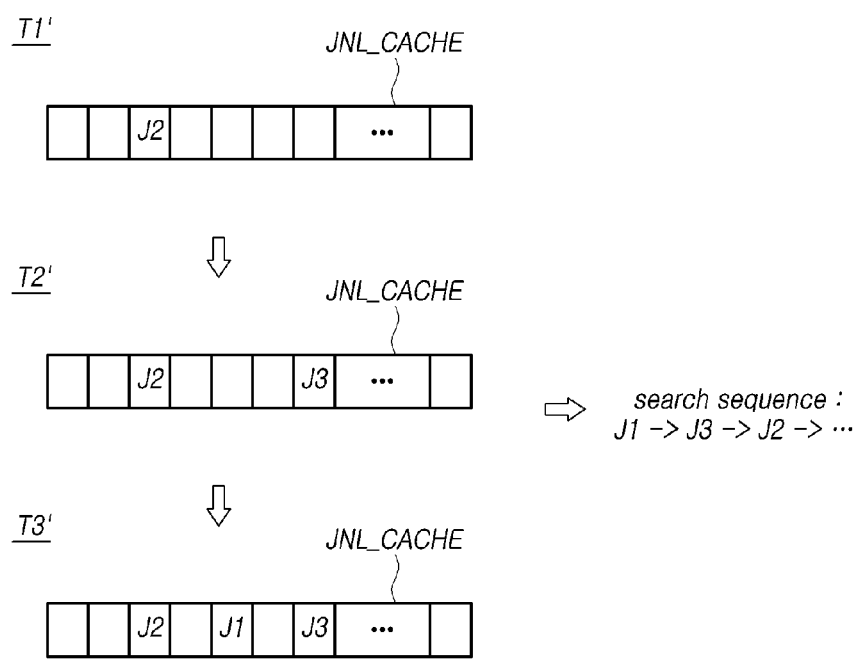
FIG. 9 is a diagram illustrating an example of the order in which a memory system searches for journal information in a journal cache based on some embodiments of the disclosed technology.

FIG. 9 is a diagram illustrating an example of the order in which the memory system 100 searches for journal information in the journal cache (JNL_CACHE) based on some embodiments of the disclosed technology.

Referring to FIG. 9, the target zone is the first zone (Z1), when searching for journal information corresponding to the first zone (Z1) in the journal cache (JNL_CACHE), and the memory controller 120 of the memory system 100 may search for one or more pieces of journal information cached in the journal cache (JNL_CACHE) in an inverse chronological order.

For example, it is assumed that journal information 2 (J2) is cached in the journal cache (JNL_CACHE) at time T1', journal information 3 (J3) is cached in the journal cache (JNL_CACHE) at time T2', and journal information 1 (J1) is cached in the journal cache (JNL_CACHE) at time T3'. In this case, when searching for journal information corresponding to the first zone (Z1) in the journal cache (JNL_CACHE), the memory controller 120 may search for the journal information in the inverse chronological order of storage, that is, in the order of journal information 1 (J1), journal information 3 (J3), and journal information 2 (J2). That is, journal information most recently cached in the journal cache (JNL_CACHE) is first found.

As described above, the reason why the memory controller 120 searches for the journal information cached in the journal cache (JNL_CACHE) in the inverse chronological order is that data written in the same zone is highly likely to be intensively written.

For example, it is highly likely to generate the operation of writing the data in the first zone (Z1) intensively during a first time interval, the operation of writing the data in the second zone (Z2) intensively during a second time interval, and the operation of writing the data in the third zone (Z3) intensively during a third time interval rather than randomly generating the operation of writing the data in the first zone (Z1), the operation of writing the data in the second zone (Z2), and the operation of writing the data in the third zone (Z3).

Accordingly, when the data is currently written in the first zone (Z1), it is highly likely that data written next is also written in the first zone (Z1), and thus it is highly likely to update most recently updated journal information. Therefore, in order to minimize a time spent for searching for journal information, the memory controller 120 may search for one or more pieces of journal information cached in the journal cache (JNL_CACHE) in the inverse chronological order.

Figure 10:
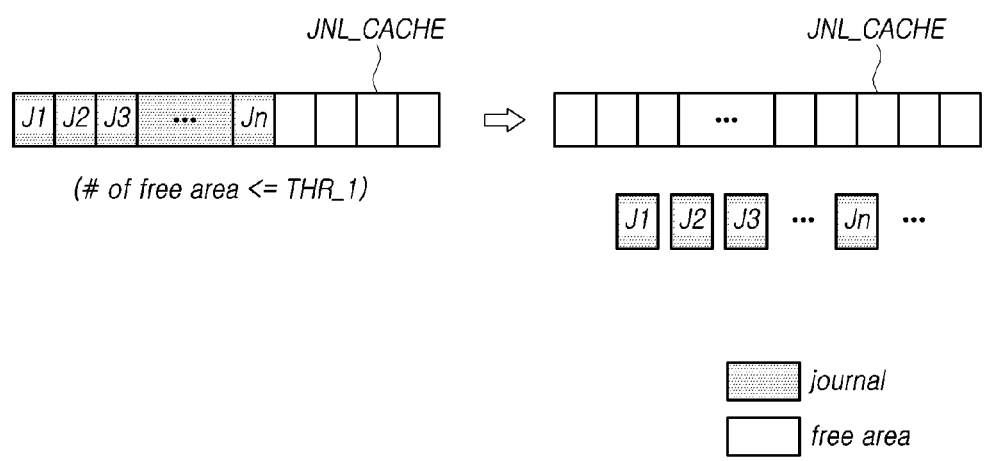
FIG. 10 is a diagram illustrating an operation in which a memory system evicts all journal information cached in a journal cache based on some embodiments of the disclosed technology.

FIG. 10 is a diagram illustrating an operation in which the memory system 100 evicts all pieces of journal information cached in the journal cache (JNL_CACHE) based on some embodiments of the disclosed technology.

Referring to FIG. 10, when the number of pieces of journal information, which can be additionally stored in the journal cache (JNL_CACHE), is equal to or smaller than a first threshold (THR_1), the memory controller 120 of the memory system 100 may "evict" all pieces of journal information cached in the journal cache (JNL_CACHE) from the journal cache (JNL_CACHE). In this patent document, the term "evict" can be used to indicate the "cache eviction" process by which old, relatively unused, or excessively voluminous data can be dropped from the cache, allowing the cache to remain within a memory budget.

The first threshold value (THR_1) may be larger than or equal to zero (0). For example, when the first threshold (THR_1) is zero (0), the memory controller 120 may delete all pieces of journal information cached in the journal cache (JNL_CACHE) from the journal cache (JNL_CACHE) when the journal cache (JNL_CACHE) becomes full.

For example, it is assumed that n pieces of journal information (J1, J2, J3, . . . , Jn) are cached in the journal cache (JNL_CACHE) and the number of pieces of journal information, which can be additionally stored in the journal cache (JNL_CACHE), is equal to or smaller than the first threshold (THR_1). The memory controller 120 may evict (remove) all of the n pieces of journal information (J1, J2, J3, . . . , Jn) from the journal cache (JNL_CACHE). In this case, the journal cache (JNL_CACHE) is in an empty state in which no journal information is stored.

Figure 11:
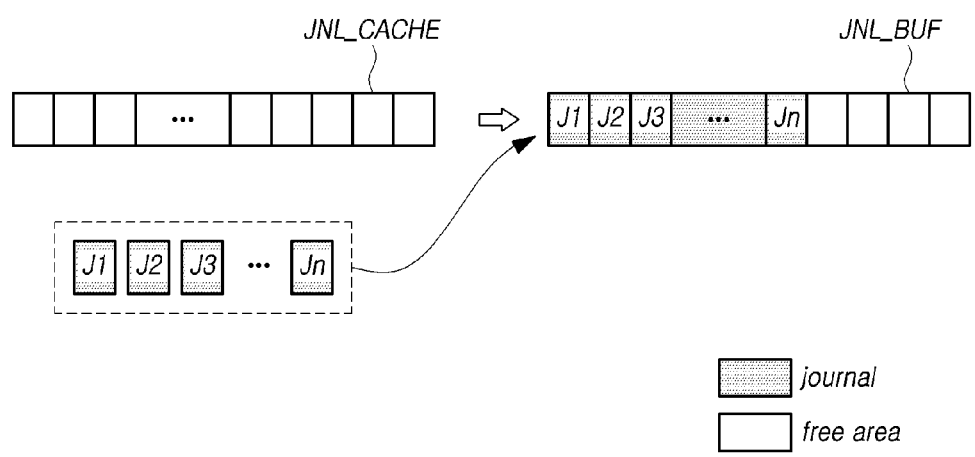
FIG. 11 is a diagram illustrating an operation in which a memory system stores journal information evicted from a journal cache in a journal buffer based on some embodiments of the disclosed technology.
Figure 12:
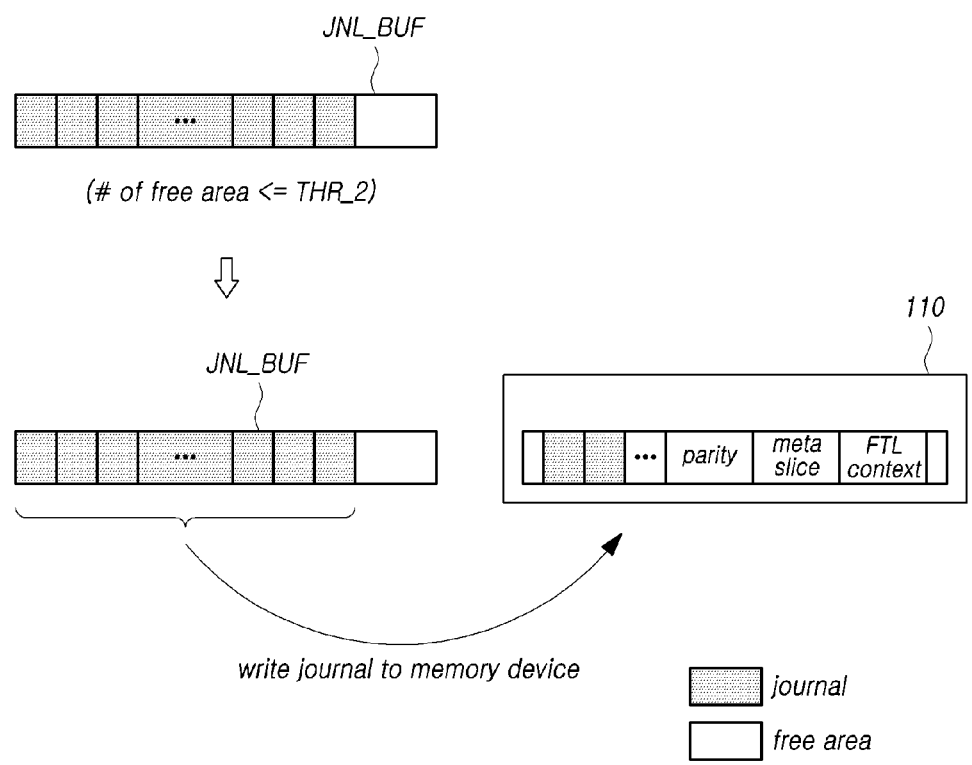
FIG. 12 is a diagram illustrating an operation in which a memory system writes journal information stored in a journal buffer to a memory device based on some embodiments of the disclosed technology.

Hereinafter, FIGS. 11 to 12 illustrate an operation in which the memory system 100 processes journal information evicted from the journal cache (JNL_CACHE).

FIG. 11 is a diagram illustrating an operation in which the memory system 100 stores journal information evicted from the journal cache (JNL_CACHE) in a journal buffer (JNL_BUF) based on embodiments of the disclosed technology.

Referring to FIG. 11, the memory controller 120 may migrate all of n pieces of journal information (J1, J2, J3, . . . , Jn) evicted/removed from the journal cache (JNL_CACHE) to the journal buffer (JNL_CACHE).

The journal buffer (JNL_BUF) is a buffer for temporarily storing journal information to be written in the memory device 110 and may be located in the working memory 125 of the memory controller 120. The memory in which the journal buffer (JNL_BUF) is located may operate at a lower speed than the memory in which the journal cache (JNL_CACHE) is located, but may have a larger storage capacity. For example, the journal buffer (JNL_BUF) may be located in the DRAM included in the working memory 125.

In some implementations, the journal buffer (JNL_BUF) may additionally store other journal information as well as the n pieces of journal information (J1, J2, J3, . . . , Jn) deleted from the journal cache (JNL_CACHE). For example, the journal buffer (JNL_BUF) may be journal information cached in the journal cache (JNL_CACHE) before the n pieces of journal information (J1, J2, J3, . . . , Jn) are cached in the journal cached (JNL_CACHE).

FIG. 12 is a diagram illustrating an operation in which the memory system 100 writes journal information stored in the journal buffer (JNL_BUF) to the memory device 110 based on embodiments of the disclosed technology.

Referring to FIG. 12, the memory controller 120 of the memory system 100 may write all pieces of journal information stored in the journal buffer (JNL_BUF) in the memory device 110 when the number of pieces of journal information, which can be additionally stored in the journal buffer (JNL_BUF), is equal to or smaller than a second threshold (THR_2).

The second threshold (THR_2) may be larger than or equal to zero (0). For example, when the second threshold (THR_2) is zero (0), the memory controller 120 may write all pieces of journal information stored in the journal buffer (JNL_BUF) in the memory device 110 when the journal buffer (JNL_BUF) is full. All pieces of journal information stored in the journal buffer (JNL_BUF) may be stored in an area in which the memory device 110 stores metadata information along with parity, context information of FTL, and a slice of metadata.

When the memory controller 120 writes all pieces of journal information stored in the journal buffer (JNL_BUF) in the memory device 110, all pieces of journal information stored in the journal buffer (JNL_BUF) are reflected in the memory device 110, and thus the corresponding journal information does not need to be maintained in the journal buffer (JNL_BUF) any more. Accordingly, the memory controller 120 may make the journal buffer (JNL_BUF) be in a null state.

Figure 13:
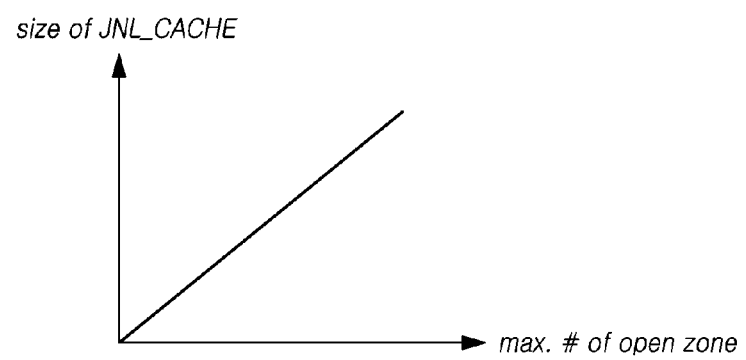
FIG. 13 is a diagram illustrating the relationship between a maximum value of the number of open zones and the size of the journal cache based on some embodiments of the disclosed technology.

FIG. 13 is a diagram illustrating the relationship between a maximum value of the number of open zones and the size of the journal cache based on embodiments of the disclosed technology.

Referring to FIG. 13, the size of the journal cache (JNL_CACHE) may be proportional to a maximum value of the number of open zones among n zones (Z1, Z2, Z3, . . . , Zn) included in the above-described namespace (NS).

The open zone includes a free area to which data can be written, that is, a zone available for writing data. The memory controller 120 may write data only in the open zone.

When the size of the journal cache (JNL_CACHE) is small, journal information having a high hit possibility may be deleted to secure the free area of the journal cache (JNL_CACHE), so that a hit ratio may decrease. In addition, since the journal cache (JNL_CACHE) is limited in allocable resources, it is not possible to unlimitedly increase the size of the journal cache (JNL_CACHE). Accordingly, it is required to configure the size of the journal cache (JNL_CACHE) that can maximize the hit ratio under the limitation on resources.

As described above, data can be written only in the open zone, so that mapping information may be updated only for the open zone and accordingly only journal information corresponding to the open zone may be generated. Therefore, when the size of the journal cache (JNL_CACHE) is configured in proportion to the maximum value of the number of open zones, it is possible to always guarantee the hit of journal information in the journal cache (JNL_CACHE) except the case in which the journal information is initially generated in the process of writing data.

On the other hand, when it is not possible to configure the size of the journal cache (JNL_CACHE) in proportion to the maximum value of the number of open zones due to the limitation on resources which can be allocated to the journal cache (JNL_CACHE) unlike FIG. 13, the memory controller 120 may determine the size of the journal cache (JNL_CACHE) as a preset value, but if a space for new journal information lacks, sacrificial journal information may be selected from the journal information cached in the journal cache (JNL_CACHE) based on a preset cache exchange policy (e.g., LRU or LRFU) and the sacrificial journal information may be evicted/removed from the journal cache (JNL_CACHE).

Figure 14:
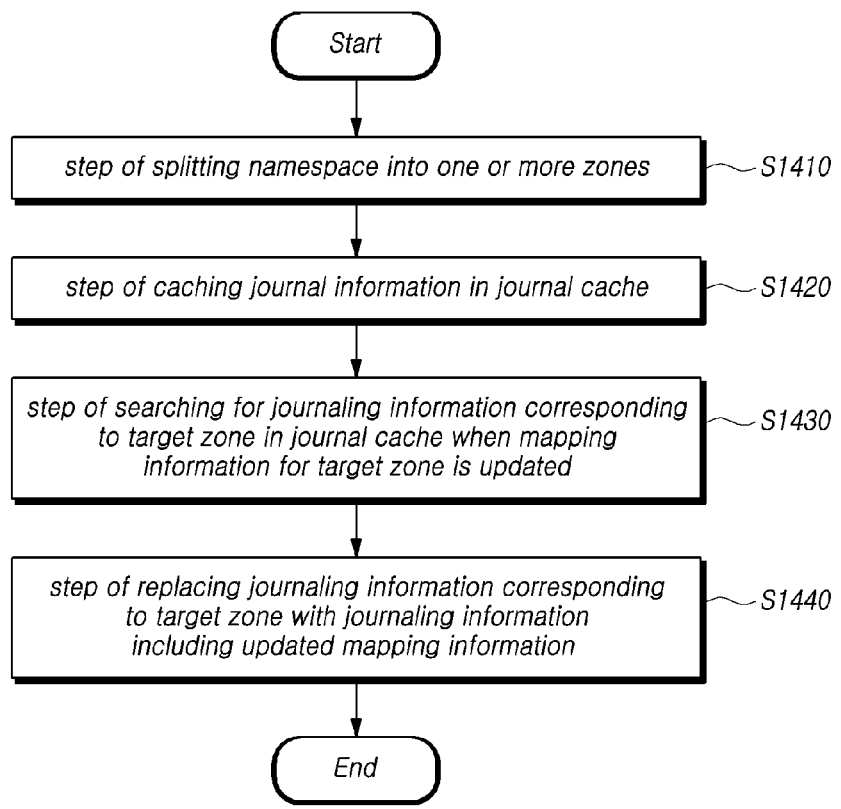
FIG. 14 is a flowchart illustrating a method of operating a memory system based on some embodiments of the disclosed technology.

FIG. 14 is a flowchart illustrating a method of operating the memory system 100 based on embodiments of the disclosed technology.

First, the method of operating the memory system 100 may include, at S1410, splitting a namespace (NS) included in the memory device 110 into one or more zones in which data can be sequentially written.

The method of operating the memory system 100 may include, at S1420, storing (caching) journal information including mapping information (MAP_INFO) between a logical address and a physical address for one of the one or more zones split in step S1410 in the journal cache (JNL_CACHE).

The method of operating the memory system 100 may include, at S1430, searching for journal information corresponding to a target zone in the journal cache (JNL_CACHE) when the mapping information (MAP_INFO) for the target zone among the above-described one or more zones is updated. The memory system 100 may search for, for example, the journal information corresponding to the target zone in the inverse chronological order.

The method of operating the memory system 100 may include, at S1440, replacing the journal information corresponding to the target zone with journal information including the updated mapping information (MAP_INFO).

In some implementations, the journal information corresponding to the target zone may include a write pointer (WR_PTR). The write pointer (WR_PTR) may indicate an address of written data when the data is written in the target zone. The write pointer (WR_PTR) may be updated in a direction in which a value of the write pointer (WR_PTR) increases.

The method of operating the memory system 100 may further include, when the number of pieces of journal information, which can be additionally stored in the journal cache (JNL_CACHE), is smaller than or equal to a first threshold (THR_1), evicting all pieces of journal information cached in the journal cache (JNL_CACHE) from the journal cache (JNL_CACHE) as well as the above-described steps.

The method of operating the memory system 100 may further include migrating all pieces of journal information evicted from the journal cache (JNL_CACHE) to the journal buffer (JNL_BUF) and a step of, when the number of pieces of journal information, which can be additionally stored in the journal buffer, (JNL_BUF) is smaller than or equal to a second threshold (THR_2), writing all pieces of journal information stored in the journal buffer (JNL_BUF) in the memory device 110.

In some implementations, the size of the journal cache (JNL_CACHE) may be proportional to a maximum value of the number of open zones corresponding to zones, in which writing is possible, among the one or more zones.

In some implementations, the operation of the memory controller 120 described above may be controlled by the control circuit 123 and may be performed through a method by which the processor 124 executes (drives) firmware in which all sorts of operations of the memory controller 120 are programmed.

Figure 15:
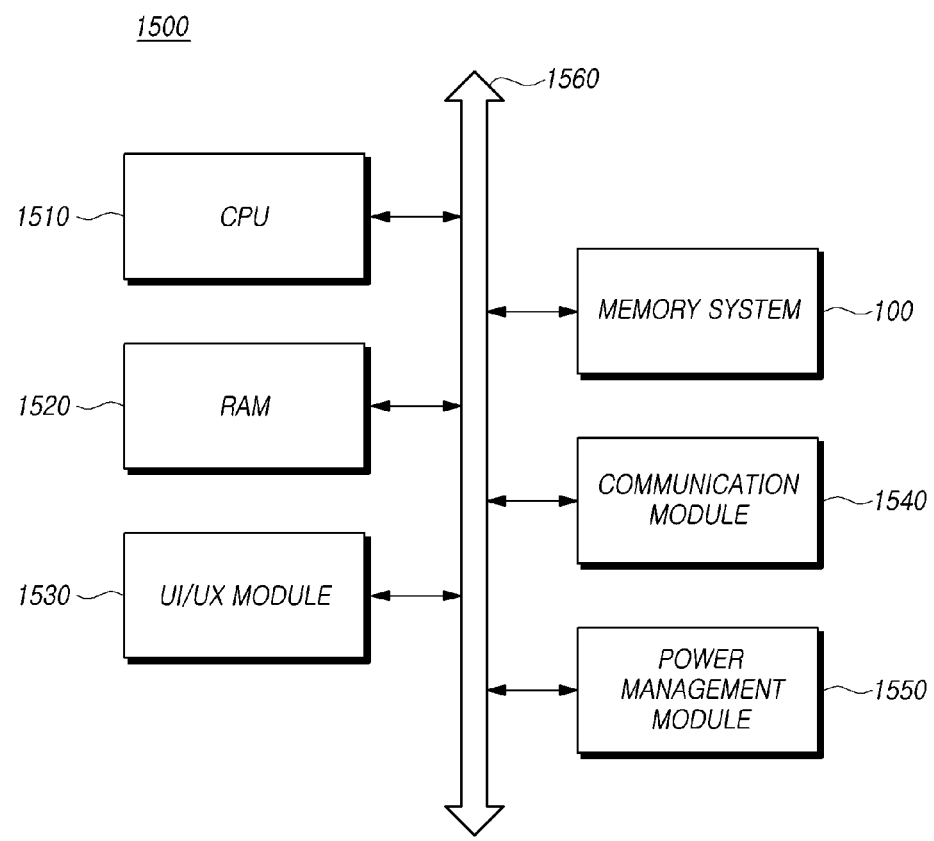
FIG. 15 is a diagram illustrating the configuration of a computing system based on some embodiments of the disclosed technology.

FIG. 15 is a diagram illustrating the configuration of a computing system 1500 based on an embodiment of the disclosed technology.

Referring to FIG. 15, the computing system 1500 based on an embodiment of the disclosed technology may include: a memory system 100 electrically connected to a system bus 1560; a CPU 1510 configured to control the overall operation of the computing system 1500; a RAM 1520 configured to store data and information related to operations of the computing system 1500; a user interface/user experience (UI/UX) module 1530 configured to provide the user with a user environment; a communication module 1540 configured to communicate with an external device as a wired and/or wireless type; and a power management module 1550 configured to manage power used by the computing system 1500.

The computing system 1500 may be a personal computer (PC) or may include a mobile terminal such as a smartphone, a tablet or various electronic devices.

The computing system 1500 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in this patent document.

What is claimed is:

1. A memory system comprising:
a memory device including memory cells for storing data and operable to perform an operation on one or more memory cells including, a read operation for reading data stored in one or more memory cells, a program operation for writing new data into one or more memory cells, or an erase operation for deleting stored data in one or more memory cells; and
a memory controller in communication with the memory device and configured to control the memory device to perform an operation,
wherein the memory controller is further configured to:
control the memory device to store data into zones of memory blocks in the memory device by assigning each data to be written with an address subsequent to a most recently written address in a zone, wherein the zones of memory blocks are split from a namespace in the memory device;
storing, in a journal cache, journal information comprising mapping information between a logical address and a physical address for one of the one or more zones;
search, in the journal cache, for journal information corresponding to a target zone targeted to write data, when mapping information for the target zone among the one or more zones is updated; and
replace the journal information corresponding to the target zone with journal information comprising the updated mapping information,
wherein, when a number of pieces of information to be additionally stored in the journal cache is smaller than or equal to a first threshold, the memory controller evicts all pieces of journal information cached in the journal cache from the journal cache, and
wherein the memory controller migrates all pieces of journal information evicted from the journal cache to a journal buffer, and writes all pieces of journal information stored in the journal buffer in the memory device when a number of pieces of journal information to be additionally stored in the journal buffer is smaller than or equal to a second threshold.

2. The memory system of claim 1, wherein the journal information corresponding to the target zone comprises a write pointer indicating an address for writing data in the target zone.

3. The memory system of claim 2, wherein the memory controller updates the write pointer in a sequence in which a value of the write pointer increases.

4. The memory system of claim 1, wherein, when searching for the journal information corresponding to the target zone in the journal cache, the memory controller searches for one or more pieces of journal information cached in the journal cache in an inverse chronological order of data storage events.

5. The memory system of claim 1, wherein a size of the journal cache is proportional to a maximum value of a number of open zones available for writing data among the one or more zones.

6. A memory controller for a memory device, comprising:
a memory interface in communication with the memory device; and a processor in communication with the memory device through the memory interface and configured to:

control the memory device to store data into zones of memory blocks in the memory device by assigning each data to be written with an address subsequent to a most recently written address in a zone, wherein the zones of memory blocks are split from a namespace in the memory device;

store, in a journal cache, journal information comprising mapping information between a logical address and a physical address for one of the one or more zones;

search, in the journal cache, for journal information corresponding to a target zone targeted to write data, when mapping information for the target zone among the one or more zones is updated; and replace the journal information corresponding to the target zone with journal information comprising the updated mapping information, wherein, when a number of pieces of journal information, which can be additionally stored in the journal cache, is smaller than or equal to a first threshold, the processor evicts all pieces of journal information cached in the journal cache from the journal cache, and wherein the processor migrates all pieces of journal information evicted from the journal cache to a journal buffer, and when a number of pieces of journal information to be additionally stored in the journal buffer is smaller than or equal to a second threshold, writes all pieces of journal information stored in the journal buffer in the memory device.

7. The memory controller of claim 6, wherein the journal information corresponding to the target zone comprises a write pointer indicating an address for writing data in the target zone.

8. The memory controller of claim 7, wherein the processor updates the write pointer in a sequence in which a value of the write pointer increases.

9. The memory controller of claim 6, wherein, when searching the journal information corresponding to the target zone, the processor searches for one or more pieces of journal information cached in the journal cache in an inverse chronological order.

10. The memory controller of claim 6, wherein a size of the journal cache is proportional to a maximum value of a number of open zones available for writing data among the one or more zones.

11. A method of operating a memory system comprising a memory device, the method comprising:

controlling the memory device to store data into zones of memory blocks in the memory device by assigning each data to be written with an address subsequent to a most recently written address in a zone, wherein the zones of memory blocks are split from a namespace in the memory device;

storing, in a journal cache, journal information comprising mapping information between a logical address and a physical address for one of the one or more zones;

searching, in the journal cache, for journal information corresponding to a target zone targeted to write data when mapping information for the target zone among the one or more zones is updated;

replacing the journal information corresponding to the target zone with journal information comprising the updated mapping information, when a number of pieces of information to be additionally stored in the journal cache, is smaller than or equal to a first threshold, evicting pieces of journal information cached in the journal cache from the journal cache, migrating all pieces of journal information evicted from the journal cache to a journal buffer; and when a number of pieces of journal information to be additionally stored in the journal buffer, is smaller than or equal to a second threshold, writing all pieces of journal information stored in the journal buffer in the memory device.

12. The method of claim 11, wherein the journal information corresponding to the target zone comprises a write pointer indicating an address for writing data in the target zone.

13. The method of claim 12, wherein the write pointer is updated in a sequence in which a value of the write pointer increases.

14. The method of claim 11, wherein the searching for the journal information corresponding to the target zone in the journal cache comprises searching for one or more pieces of journal information cached in the journal cache in an inverse chronological order of data storage events.

15. The method of claim 11, wherein a size of the journal cache is proportional to a maximum value of a number of open zones available for writing data among the one or more zones.

* * * * *